United States Patent
Dix et al.

(10) Patent No.: US 8,858,392 B2
(45) Date of Patent: Oct. 14, 2014

(54) PROPORTIONAL PARKING BRAKE CONTROL IN COOPERATION WITH OPERATION OF A CONTINUOUSLY VARIABLE TRANSMISSION

(75) Inventors: Peter J. Dix, Naperville, IL (US); Garth H. Bulgrien, Ephrata, PA (US); Robert C Prasse, Chicago, IL (US); Pavel Kuros, Wood Dale, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/240,605

(22) PCT Filed: Aug. 27, 2012

(86) PCT No.: PCT/US2012/052569
§ 371 (c)(1),
(2), (4) Date: Feb. 24, 2014

(87) PCT Pub. No.: WO2013/029054
PCT Pub. Date: Feb. 28, 2013

(65) Prior Publication Data
US 2014/0187381 A1 Jul. 3, 2014

Related U.S. Application Data

(60) Provisional application No. 61/527,476, filed on Aug. 25, 2011.

(51) Int. Cl.
*F16H 61/40* (2010.01)
*B60T 1/00* (2006.01)

(52) U.S. Cl.
CPC ........................... *B60T 1/005* (2013.01)
USPC ............................................ 477/68

(58) Field of Classification Search
USPC ............... 477/68, 69, 180, 175, 52, 115, 174; 475/74, 80, 82; 701/60, 61; 74/335
See application file for complete search history.

(56) References Cited

U.S. PATENT DOCUMENTS

| | | |
|---|---|---|
| 2,097,436 A | 11/1937 | Bennetch |
| 3,810,531 A | 5/1974 | Edmunds |
| 4,055,047 A | 10/1977 | Hara |
| 4,102,222 A | 7/1978 | Miller et al. |
| 4,167,855 A | 9/1979 | Knapp |
| 4,310,078 A | 1/1982 | Shore |
| 4,489,552 A | 12/1984 | Watanabe et al. |
| 4,530,416 A | 7/1985 | Kassai |
| 4,543,786 A | 10/1985 | Shuler |
| 4,653,350 A | 3/1987 | Downs et al. |

(Continued)

*Primary Examiner* — Saul Rodriguez
*Assistant Examiner* — David J Hlavka
(74) *Attorney, Agent, or Firm* — Sue C. Watson

(57) ABSTRACT

A parking brake is controlled in concert with operation of a hydrostatic power unit of a continuously variable transmission, particularly when engaging, disengaging and shuttle shifting the transmission, to provide advantages, particularly when on hills. When particular commands are received, such as shifting to a non-moving position, the parking brake is automatically engaged to hold the vehicle position. A swash plate of the hydrostatic unit can be automatically positioned to anticipate the next command. If that command is received, the brake is automatically gradually or proportionally released and the transmission engaged to effect the commanded movement of the vehicle. If a different command is received, the brake remains engaged as the transmission is configured for the commanded movement, such that no machine movement results. Then the brake is automatically gradually or proportionally released and the transmission engaged to effect that commanded movement.

19 Claims, 9 Drawing Sheets

(56) References Cited

U.S. PATENT DOCUMENTS

| | | |
|---|---|---|
| 4,759,185 A | 7/1988 | McConnell et al. |
| 4,811,225 A | 3/1989 | Petzold et al. |
| 5,184,466 A | 2/1993 | Schniederjan et al. |
| 5,406,793 A | 4/1995 | Maruyama et al. |
| 5,449,329 A | 9/1995 | Brandon et al. |
| 5,467,854 A | 11/1995 | Creger et al. |
| 5,468,198 A | 11/1995 | Holbrook et al. |
| 5,531,304 A | 7/1996 | Ishino et al. |
| 5,540,051 A | 7/1996 | Maruyama et al. |
| 5,573,473 A | 11/1996 | Asayama et al. |
| 5,580,332 A | 12/1996 | Mitchell et al. |
| 5,671,137 A | 9/1997 | Ishino et al. |
| 5,684,694 A | 11/1997 | Ishino et al. |
| 5,980,411 A | 11/1999 | Wontner |
| 6,080,074 A | 6/2000 | Ulbrich et al. |
| 6,088,645 A | 7/2000 | Kawasaki et al. |
| 6,115,661 A | 9/2000 | Hosseini et al. |
| 6,250,077 B1 | 6/2001 | Iino et al. |
| 6,285,942 B1 | 9/2001 | Steinmetz et al. |
| 6,292,732 B1 | 9/2001 | Steinmetz et al. |
| 6,295,497 B1 | 9/2001 | Kuras |
| 6,332,860 B1 | 12/2001 | Hubbard et al. |
| 6,442,934 B1 | 9/2002 | Okuda et al. |
| 6,481,314 B2 | 11/2002 | Nemoto et al. |
| 6,524,205 B1 | 2/2003 | Irikura et al. |
| 6,616,559 B1 | 9/2003 | Hori et al. |
| 6,672,990 B2 | 1/2004 | Netzer |
| 6,832,978 B2 | 12/2004 | Buchanan et al. |
| 7,037,236 B2 * | 5/2006 | Ishibashi et al. ............ 477/52 |
| 7,063,638 B2 | 6/2006 | Weeramantry |
| 7,082,757 B2 | 8/2006 | Teslak et al. |
| 7,147,239 B2 | 12/2006 | Teslak et al. |
| 7,278,953 B2 | 10/2007 | Meyer et al. |
| 7,549,287 B2 | 6/2009 | Foster et al. |
| 7,771,314 B2 * | 8/2010 | Eguchi et al. ............ 477/110 |
| 2001/0007212 A1 * | 7/2001 | Nemoto et al. ............ 74/731.1 |
| 2006/0172853 A1 * | 8/2006 | Ishibashi et al. ............ 477/52 |
| 2008/0139363 A1 | 6/2008 | Williams |
| 2008/0242464 A1 | 10/2008 | Kumazaki et al. |

\* cited by examiner

PROPORTIONAL PARKING BRAKE CONTROL IN COOPERATION WITH OPERATION OF A CONTINUOUSLY VARIABLE TRANSMISSION

This application claims the benefit of U.S. Provisional Application No. 61/527,476, filed Aug. 25, 2011.

TECHNICAL FIELD

The present invention relates generally to automatic operation of a parking brake in concert with operation of a continuously variable transmission, and more particularly, to a method for using automatic proportional control of a parking brake for improving certain transmission operations, such as, but not limited to, engaging, disengaging and shuttle shifting, particularly when on hills.

BACKGROUND ART

The disclosure of U.S. Provisional Application No. 61/527,476, filed Aug. 25, 2011, is hereby incorporated herein in its entirety by reference.

Continuously variable transmissions utilizing a hydrostatic power unit, hereinafter sometimes referred to as hydro-mechanical continuously variable transmissions, are well known. In operation, the fluid displacement of the hydrostatic power unit is varied to vary the output to input ratio of the transmission, that is, the ratio between the rotating output of the transmission, and the input. In one category of the transmissions, the hydrostatic power unit is configured such that to effect movement of the vehicle in one direction, a swash plate of the unit will be tilted in one direction. To effect vehicle movement in the opposite direction, the swash plate is tilted in the opposite direction. When no vehicle movement is sought, e.g., no forward or rearward motion, the swash plate of the unit is moved to a zero tilt angle or near zero angle. However, when the vehicle or machine is subject to forces or loads urging movement, e.g., when on a slope or momentum is present, forces are applied which urge the swash plate to displace from the zero position. It is also known to employ some manner for holding the swash plate in position. Then, when motion is desired, the swash plate is released and tilted one way or the other to effect operation of the transmission to move the vehicle in the desired direction.

In another category of continuously variable transmissions employing a hydrostatic power unit for varying the input output ratio, the hydrostatic unit is configured such that at zero vehicle or machine speed, the swash plate of the hydrostatic power unit is at full displacement or near full displacement, in one direction or the other, depending on the range selected, direction of travel and possibly other factors. This category of transmission is known to be used in a variety of heavy vehicles such as work machines, including for construction, earth moving, forestry, and agriculture. Reference in this regard, Weeramantry, U.S. Pat. No. 7,063,638 B2, issued Jun. 20, 2006. Typically, a continuously variable hydro-mechanical transmission of this category will have a hydrostatic unit as one power input to a planetary gear set, and a mechanical connection to the engine of the machine as a second power input, with directional input controlled by directional clutches, and the output of the planetary connected via a clutch to one or more final gear reductions in connection with a load, e.g., the wheels, tracks or other drivers of the vehicle.

An advantage of continuously variable hydro-mechanical transmissions of the second type is efficiency. If the swash plate angle is zero (output speed of the hydrostatic unit is zero), the power through the hydrostatic unit is theoretically zero (it is zero, except there are losses for leakage, lubrication, cooling, etc). This is very useful if the vehicle is often operated at speeds which require low hydrostatic unit speeds. If multiple ranges are used, each range will have more efficiency in the center, when the hydrostatic unit output speed is low. Another advantage is that power is transmitted via two paths and can be split in a variety of ways. This also enables use of a smaller hydrostatic unit. This type of transmission also has an ability to tilt the swash plate of the hydrostatic unit through its full range of travel in both directions for each gear reduction or shift range. There is considerable disadvantage in the operation of the first type of transmission by having to move the swash plate angle to the opposite direction to engage reverse which is not present with the second type, as discussed below. Also, another advantage is that the forward and reverse clutches can be located on the input side of the transmission, so that the torque capacity of those clutches does not have to be as large, and those clutches therefore do not have to be as large. Another advantage is that the transmission can be symmetric, having the same number of forward and reverse ranges, and the same top speed in reverse.

An important operational distinction between the second category of transmission and the first is that for the second type, as noted above, the zero tilt angle position of the swash plate is an intermediate position within a shift range and not an end point or zero speed position. As a result, when the vehicle is at zero or near zero ground speed, the swash plate of the hydrostatic unit will be at a substantial degree of tilt in one direction or the other (depending on the directional clutch setting) in a high output condition, in contrast with the no or low output condition of the first category of transmission. Thus, when a directional change is made via the directional clutches, the swash plate must be moved through essentially its full range of travel, that is from a fully or near fully tilted position in one direction, through the zero tilt, to a fully or near fully tilted position in the opposite direction, to change the direction of the hydrostatic unit output. This takes time, which has a number of disadvantages, including that some operators may not desire to have any significant delays or pauses when shifting, for instance, when shuttle shifting. Also, if it is desired for the vehicle to not move during a directional change, some manner of holding the vehicle stationary must be employed. This can comprise, for instance, application of the brake or brakes of the vehicle by the operator. However, this requires additional operator action and attention. And, if on a grade or hillside, and/or when heavily loaded, this presents a challenge, as the forces urging the vehicle to move can be substantial, so as to require application of a heavy braking force. Initiation and release of the vehicle brakes can also cause lurching of the vehicle when on a grade or hillside, and/or heavily loaded.

Thus, what is sought is a manner of overcoming one or more of the disadvantages or shortcomings set forth above.

SUMMARY OF THE INVENTION

What is disclosed is a method of control of a continuously variable transmission utilizing automatic proportional operation of a parking brake in concert therewith, which overcomes one or more of the shortcomings set forth above, and which has utility particularly when engaging, disengaging and shuttle shifting the transmission, and when on hills.

According to a preferred aspect of the invention, when particular commands are received, the parking brake is automatically engaged or maintained in engagement, to hold the vehicle position. A swash plate of the hydrostatic unit is automatically moved to a position for an anticipated or predicted next command, for instance, movement in a particular direction. A directional clutch for the anticipated direction can also be engaged. If the anticipated or predicted command is received, the brake is automatically gradually released and the transmission engaged to effect the commanded movement of the vehicle. If a different command is received, the brake automatically remains engaged as the transmission is configured for the received command, which can include engaging the correct directional clutch. Then the brake is automatically gradually released and the transmission engaged to effect that command.

As an advantage of the invention, the vehicle position is automatically held or maintained by the parking brake as the commanded action is executed. As a result, the transmission can be in a disengaged state and the swash plate of the hydrostatic unit can be moved quickly and easily to a required position. This can be important in instances where the swash plate must be moved through its entire range of movement, or a substantial portion thereof, to the required position, as this will effect changes in rotation of other aspects of the transmission, mainly in the planetary power unit. This is also particularly advantageous for continuously variable transmission configurations wherein the directional clutches are upstream of the planetary power unit. As another advantage of the invention, the capability to automatically proportionally control the parking brake, particularly when releasing or disengaging it, allows smoothly and quickly settling the swash plate to the required position for the commanded speed of the vehicle as the transmission is engaged and the torque and pressure in the hydrostatic power unit resultingly increase due to the load applied thereto and the vehicle begins to move, such that unexpected or opposite machine movements do not occur.

According to one aspect of the invention, a method of operating a continuously variable hydro-mechanical transmission of a vehicle, comprises steps of:

responsive to an inputted predetermined command to change an operating state or condition of the transmission or starting an engine of the vehicle:

automatically engaging or maintaining engagement of a parking brake of the vehicle to hold the vehicle at an existing position; and automatically moving a swash plate of a hydrostatic power unit of the transmission to a predetermined position for movement of the vehicle in an anticipated or predicted direction; then, if a command is received to operate the transmission to move the vehicle in the anticipated or predicted direction, then automatically engaging the transmission for moving the vehicle, and gradually releasing the parking brake to allow the vehicle to move; or if a command is received to operate the transmission to move the vehicle in a direction opposite the anticipated or predicted direction, then automatically moving the swash plate to a predetermined position for movement of the vehicle in the direction opposite the anticipated or predicted direction, then automatically engaging the transmission to move the vehicle while gradually releasing the parking brake to allow the vehicle to move.

According to another preferred aspect of the invention, the predetermined command can comprise a command to move the vehicle, for example, in a forward direction, by movement of an FNR lever or other input device; a clutch command, e.g. disengaging the transmission; a command to release the parking brake; or initial starting of the engine of the vehicle or other desired action.

According to another preferred aspect of the invention, the step of automatically moving the swash plate of the hydrostatic power unit of the transmission to the predetermined position for movement of the vehicle in the anticipated or predicted direction can comprise an additional step of automatically engaging a directional clutch for that direction.

According to still another aspect of the invention, the step of automatically moving the swash plate to the predetermined position for movement of the vehicle in the direction opposite the anticipated or predicted direction comprises disengaging the directional clutch for the predetermined direction and engaging a directional clutch for the direction opposite the anticipated or predicted direction.

DETAILED DESCRIPTION OF THE INVENTION

Figure 1:
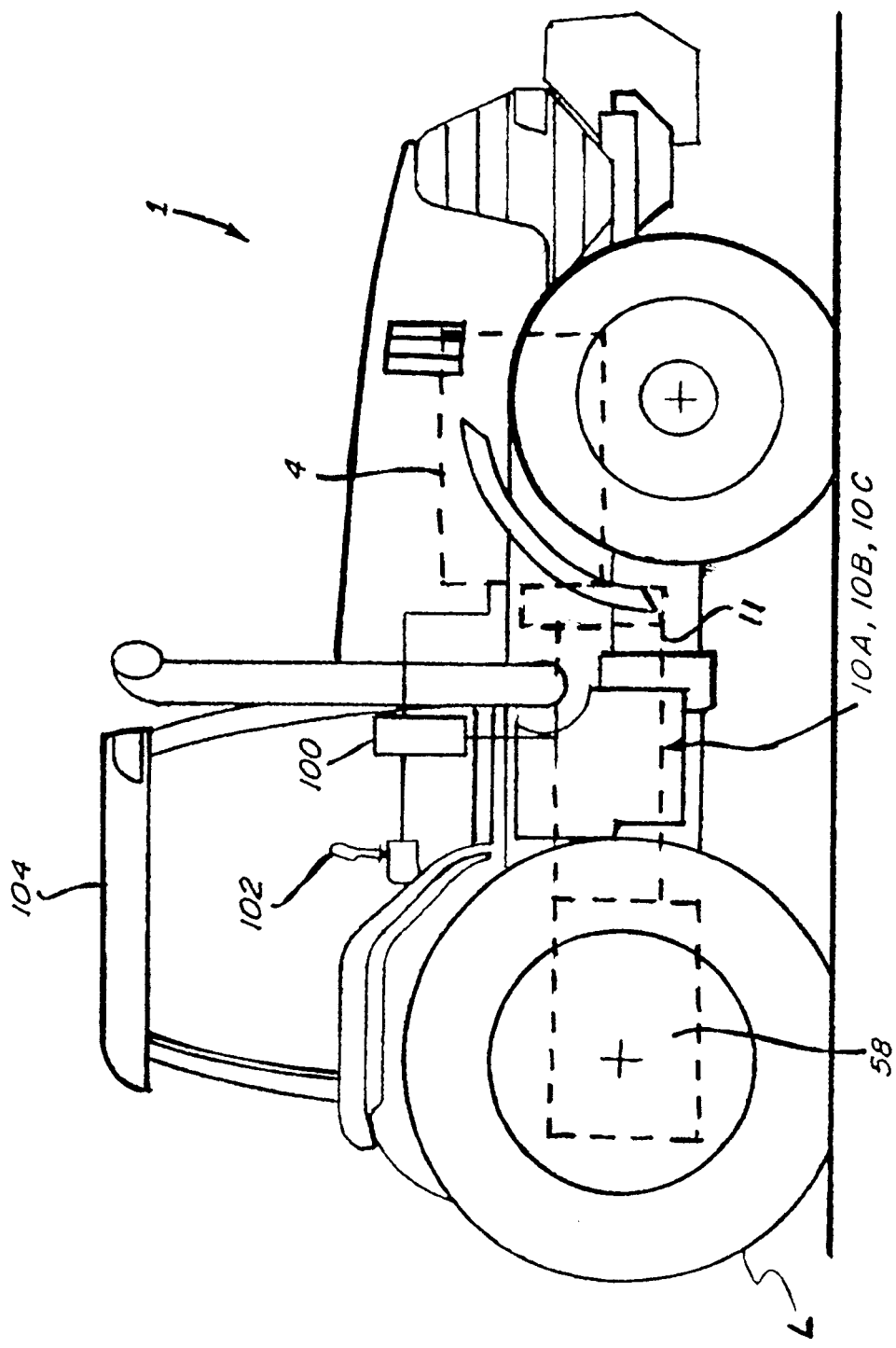
FIG. 1 is a side view of a representative work machine including a continuously variable hydro-mechanical transmission controllable according to the invention.

Referring now to the drawings, in FIG. 1 a representative vehicle which is a work machine 1 is shown, which is a tractor representative of those that can be used for a variety of uses, including, but not limited to, agriculture, construction, earth moving and forestry. Work machine 1 includes a power source 4 which will be, for instance, an internal combustion engine, and is mechanically coupled to a continuously variable hydro-mechanical transmission, three representative variants or embodiments of which are represented by numbers 10A, 10B and 10C, like parts of which being identified by like numbers. Each of transmissions 10A, 10B and 10C is controllably operable in cooperation with proportional operation of a parking brake 114 of machine 1 according to the method of the invention, and is exemplary of a wide range of possible hydro-mechanical architectures with which the present invention can be used.

Figure 2:
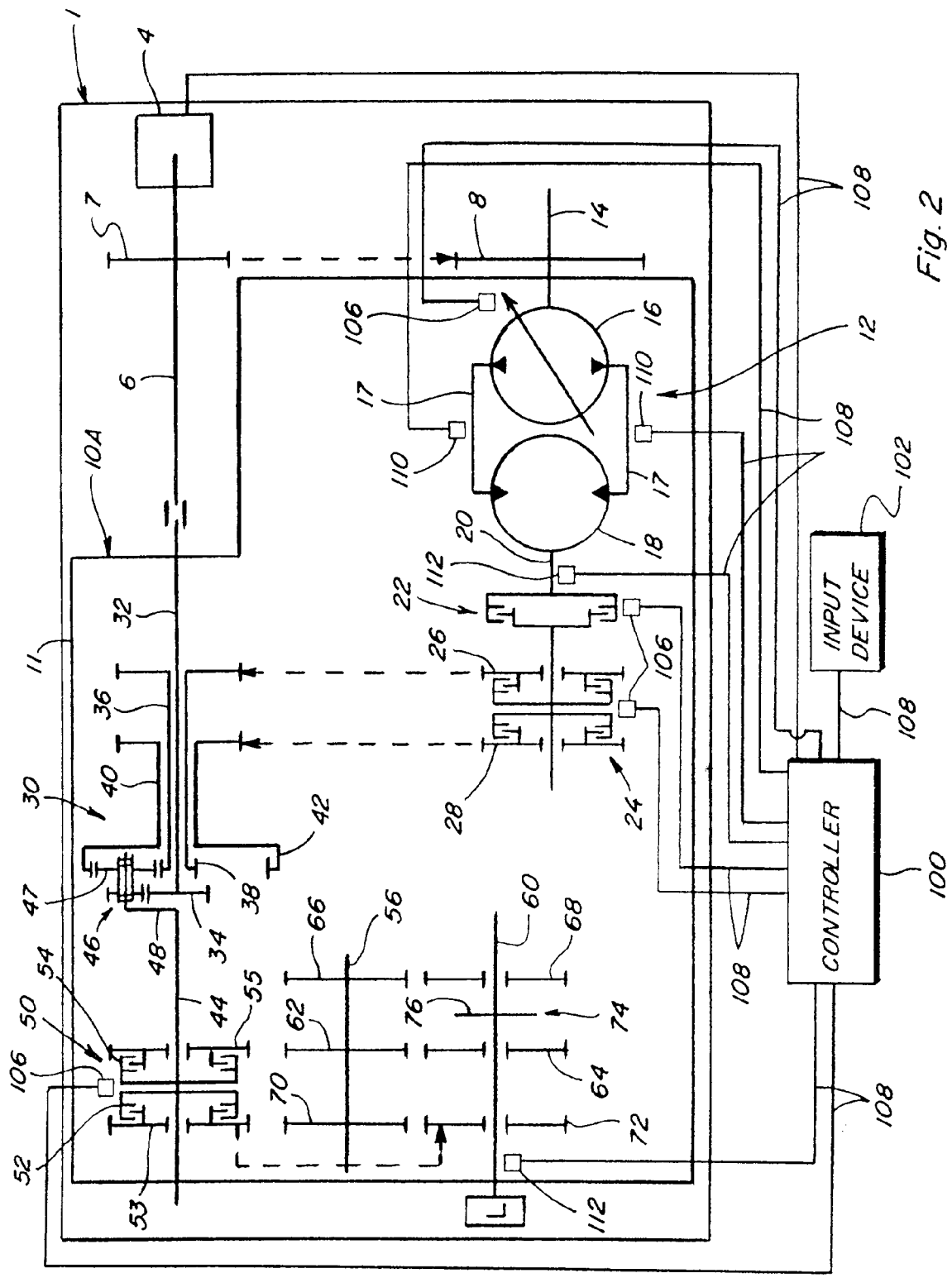
FIG. 2 is a simplified schematic representation of the work machine of FIG. 1, showing one of the embodiments of the transmission.
Figure 3:
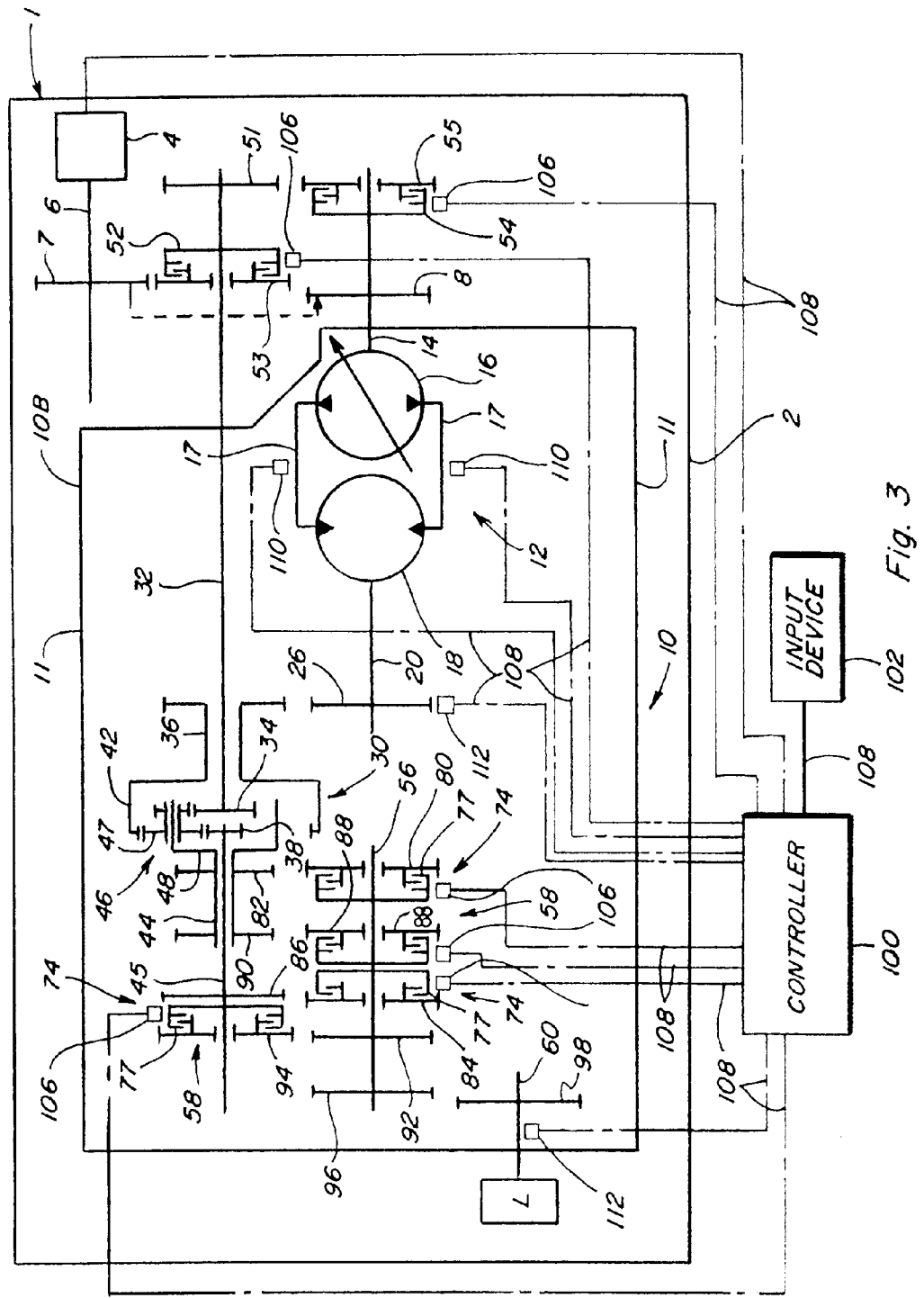
FIG. 3 is a simplified schematic representation of the work machine, showing another embodiment of the transmission.
Figure 4:
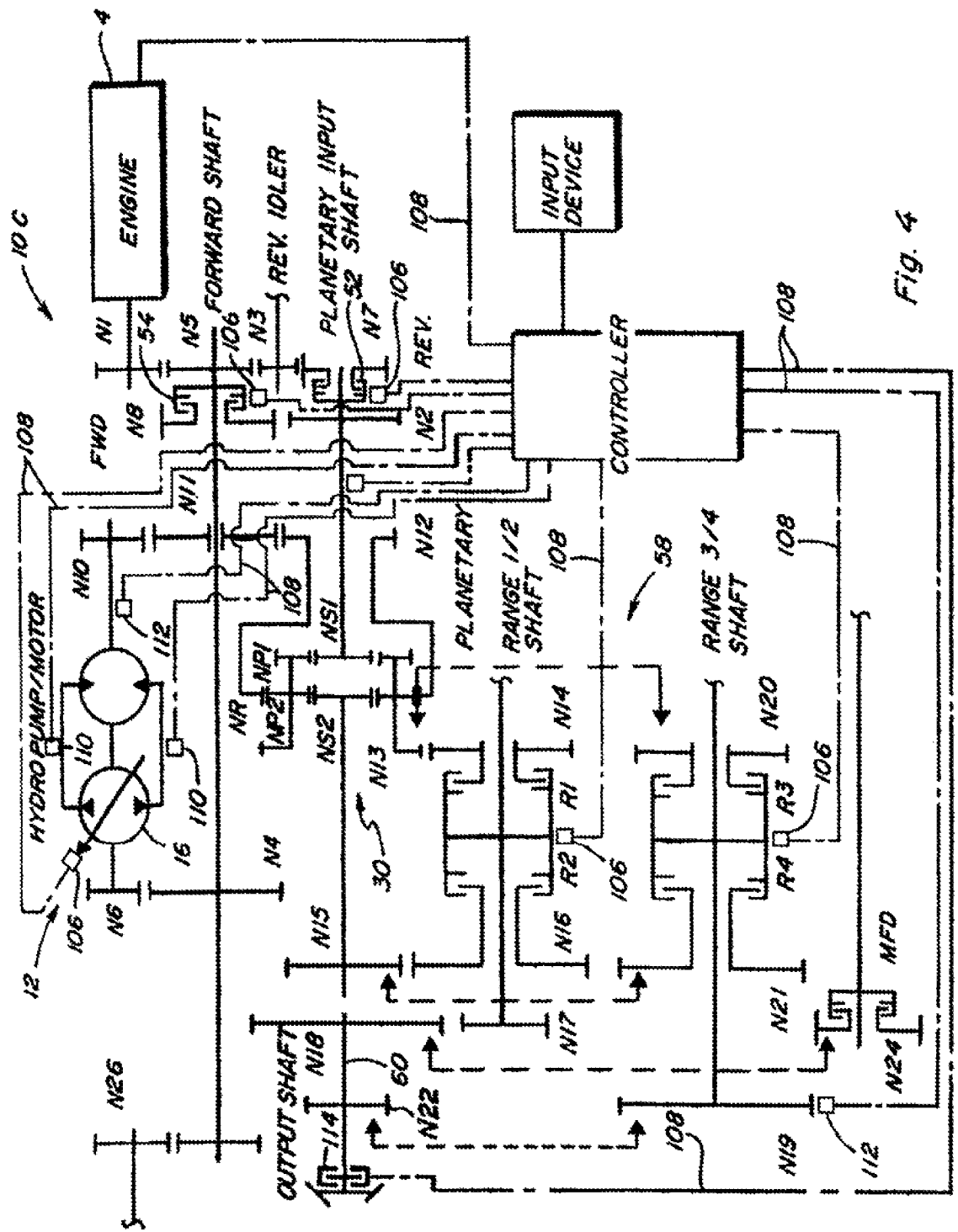
FIG. 4 is a simplified schematic representation of another embodiment of the transmission.

Referring also to FIGS. 2, 3 and 4, each of transmissions 10A, 10B and 10C includes a hydrostatic power unit 12 and a planetary power unit 30 which are coupled to a driveline including a range gear set 58 mounted within a transmission housing 11 and coupled to a load L which here is the drive wheels of machine 1 as shown in FIG. 1. It should be understood that machine 1 can alternatively include a load L that comprises a track drive, or an operating system of the machine such as but not limited to, a power take off (PTO).

Referring in particular to FIG. 2, hydrostatic power unit 12 of transmission 10A includes a fluid pump 16 coupled by fluid conduits 17 in a closed loop to a fluid motor 18. Power unit 12 includes a first input shaft 14 drivingly connected to pump 16 and a first output shaft 20 drivingly connected to motor 18. Power unit 12 is coupled to a synchronous lockup clutch 24 by first output shaft 20. Depending upon the desired speed of work machine 1 or the desired rpm of the load L, inputted to a processor based controller 100 by an input device 102 located preferably in operator cab 104 of machine 1, clutch 24 will be automatically actuated by controller 100 to couple drive gear 26 to input shaft 36, or drive gear 28 to input shaft 40, to select an appropriate hydrostatic input gear range. At the same time, controller 100 also adjusts the angle of a swash plate of pump 16 (swash plate denoted by a diagonal arrow through pump 16), through a range of positions. As an exemplary embodiment, pump 16 can be an electronically controlled variable displacement hydraulic pump of well known construction. A hydrostatic power unit driving gear 7 coupled to the input shaft 6 from the power source 4 with the hydrostatic power unit driving gear 7 engaging a hydrostatic power unit driven gear 8 that is coupled to the first input shaft 14 drives the hydrostatic power unit 12.

Figure 5:
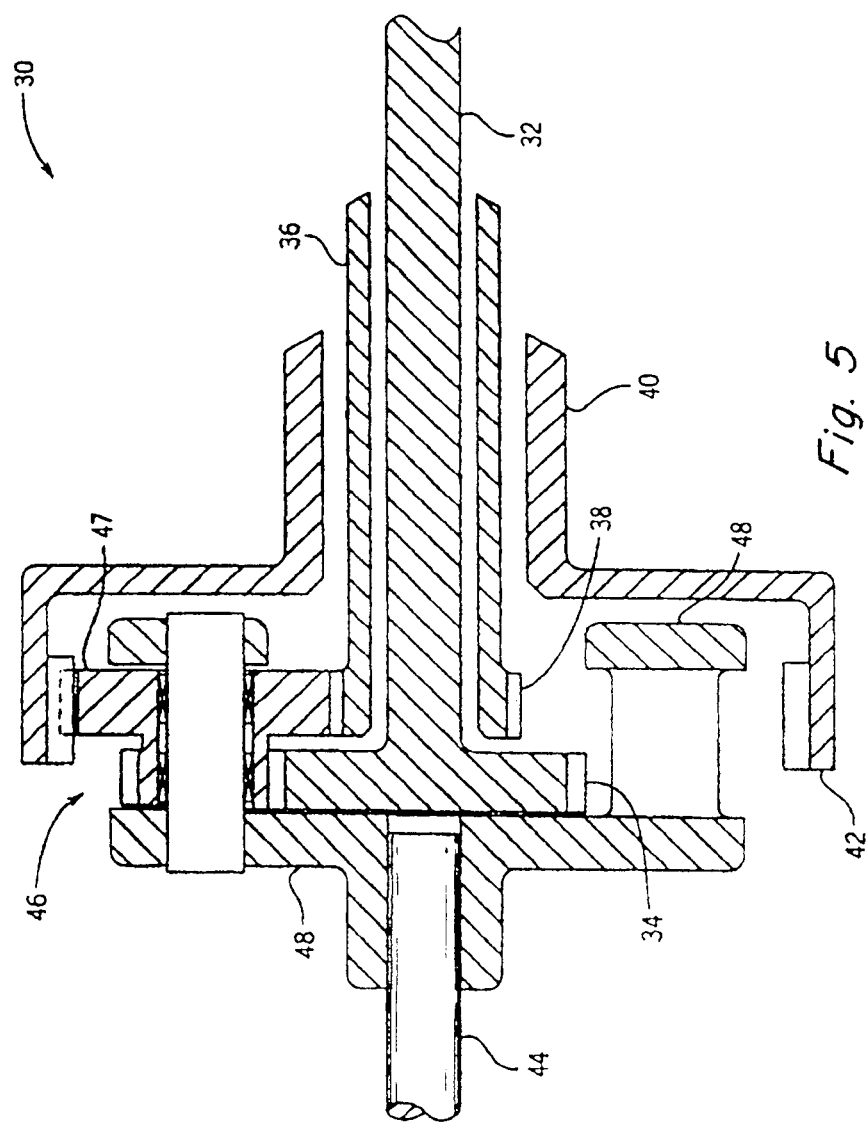
FIG. 5 is a partial sectional view of an exemplary embodiment of a planetary power unit for the transmission of FIG. 2.

Planetary power unit 30 is coupled to the power source 4 with a second input shaft 32 and the input shaft 6. The planetary power unit 30 also includes a third input shaft 36, a fourth input shaft 40 and a second output shaft 44. The second input shaft 32, the third input shaft 36, the fourth input shaft 40 and the second output shaft 44 are all coaxial with the second input shaft 32 inside the hollow third input shaft 36 which in turn is within the fourth input shaft 40 as shown in FIG. 5. The planetary power unit 30 is selectively coupled to the load L; selectively coupled to the hydrostatic power unit 12; and coupled to the power source 4, automatically by controller 100 utilizing various clutches as will be described below. The hydro-mechanical transmission 10A also includes a load shaft 60 which is coupled to the load L and mounted for rotation in the housing 11. Parking brake 114 is shown disposed in connection with load shaft 60 and is operable for limiting and preventing rotation thereof, as explained below. An intermediate shaft 56 rotatably mounted in the housing 11 supports a range gear set 58 mounted for rotation in the housing 11 and selectively coupled to the planetary power unit 30 and the load shaft 60.

The planetary power unit 30 comprises a primary sun gear 34 coupled to the second input shaft 32, which is directly coupled to the power source via input shaft 6. A secondary sun gear 38 is coupled to the third input shaft 36, which is selectively coupled to the first output shaft 20 by synchronous lockup clutch 24 under control of controller 100. A ring gear 42 is coupled to the fourth input shaft 40, which is selectively coupled to the first output shaft 20 also with the synchronous lockup clutch 24 under control of the controller. A compound planetary gear cluster 46 mounted on a compound planetary gear carrier 48 engages with the primary sun gear 34, the secondary sun gear 38 and the ring gear 42. The compound planetary gear carrier 48 is coupled to the second output shaft 32 of the planetary power unit 30. Compound planetary gear carrier 48 supports three compound planetary gears 47 which make up the compound planetary gear cluster 46. The planetary ratios should be set up such that the speed of carrier 48 increases seamlessly after shifts.

The synchronous lockup clutch 24 is controlled by controller 100 to selectively engage driving gears 26 and 28 which engage third input shaft 36 and fourth input shaft 40, respectively. When driving gear 26 is driven by the hydrostatic power unit 12, it drives the secondary sun gear 38. When driving gear 28 is driven by the hydrostatic power unit 12, it drives the fourth input shaft 40, which in turn drives the ring gear 42 within planetary power unit 30. The speeds of gears 26 and 28 will be synchronous to enable shifting between those gears. The above described power transmissions occur in the upstream side of unit 30 of the hydro-mechanical transmission 10A. On the down stream side of unit 30 a single output shaft, designated as the second output shaft 44 is coupled within unit 30 with the compound planetary gear carrier 48. The second output shaft 44 is coupled to the directional clutch 50, which has a forward component 54 and a reverse component 52 which respectively drive gears 55 and 53 to control the forward or reverse directions of the work machine 1, as selected by the operator through controller 100.

Intermediate shaft 56 is rotatably mounted in the housing 11 and supports a road range input gear 62, which in turn engages a road range output gear 64 mounted on the load shaft 60. A work range input gear 66 coupled to the intermediate shaft 56 engages a work range output gear 68 also mounted on the load shaft 60. A reverse gear 70 is coupled to the intermediate shaft 56 and engages an idler reverse gear 72 mounted on the load shaft 60. A range selector 74 is coupled to the load shaft and is controlled by the operator of machine 1 to select either the road range speeds or the work range speeds. In an exemplary embodiment of the hydro-mechanical transmission, the range selector 74 is a sliding collar or synchronizer 76.

Once the operator selects between the working range and road range speeds, controller 100 will automatically control the pump swash plate angle in the hydrostatic power unit 12 and the selection of one of the drive gears 26 or 28 coupled to the first output shaft 20 to achieve speed control. In low speeds, the hydrostatic drive is driven through ring gear 42, which is coupled to the fourth input shaft 40 and is driven by driving gear 28. The gear ratios in the planetary power unit 30 are designed so that a synchronous condition will occur at the most desirable speed within a given working range. With machine 1 starting from rest, the swash plate angle of the pump 16 is automatically increased in order to increase machine or rpm speed until a synchronous speed of gears 26 and 28 is reached. At that same speed, the synchronous lockup clutch 24 will be automatically actuated to disengage driving gear 28 and engage driving gear 26 to drive the secondary sun gear 38. With such change occurring automatically at a synchronous speed it is "seamless" with little or no energy dissipation. With the hydrostatic drive power being delivered through the secondary sun gear 38, the swash plate angle is reduced to increase speed of the compound planetary gear carrier 48 until a maximum speed of machine 1 is reached. It is also possible to engage both drive gears 26 and 28 with the synchronous lockup clutch 24 and with disconnect clutch 22 disconnecting output shaft 20 in which all gears of the planetary power unit 30 will be transmitting power and thereby providing a very high efficiency through the hydro-mechanical transmission 10A. Under some operating conditions, controller 100 will completely disengage the hydrostatic power unit 12 from the planetary power unit 30 through the hydrostatic disconnect clutch 22. In such instance, only direct mechanical power from the power source 4 is provided to the planetary power unit driving only the primary sun gear 34 which in turn drives the compound planetary gear cluster 46 and the second output shaft 44.

It is also possible for a full shuttle reverse in either the work range or road range by means of the directional clutch 50. Since the directional change occurs downstream of the planetary power unit 30, it is not necessary to change the swash plate position of the pump 16 in the hydrostatic power unit 12 if the same forward to reverse ratio is retained.

The configuration of the hydro-mechanical transmission described above provides that the synchronized ratio change gear speeds takes place on the input side (upstream side) of the planetary power unit 30 in the hydrostatic power unit 12 with only one output shaft 44 from planetary power unit 30, under control of controller 100.

The control of the various clutches and the swash plate angle of the pump 16 in the hydrostatic power unit 12, will be automatically controlled by controller 100, using actuators 106 connected to controller via suitable conductive paths 108, which can be wires of a wiring harness, a wired or wireless communications network or the like, and which also connect to input device 102. Transmission 10A also includes appropriate sensors, including pressure sensors 110 for sensing pressure conditions in conduits 17 connecting pump 16 and motor 18, and speed sensors 112 for sensing a speed of first output shaft 20 and a speed of load shaft 60, all connected to controller 100 via conductive paths 108. Controller 100 is connected to power source 4, also via conductive paths 108, to receive data such as speed data, e.g., of input shaft 6, therefrom.

Referring in particular to FIG. 3, the second embodiment of a hydro-mechanical transmission 10B eliminates the operator preselected work range or road range of speeds per se. However, seamless speed changes from zero to a maximum speed, such as 50 km per hour can be obtained through four gear ranges defined as range "A", "B", "C", and "D" with synchronized shift points between each range to obtain the seamless speed changing. In this embodiment, the synchronized ratio changing is automatically controlled by a controller 100 and takes place on the output side (downstream side) of the compound planetary power unit 30 which has two coaxial output shafts 44 and 45. As with transmission 10A above, controller 100 is connected to the various actuators 106 of the clutches and pump 16, pressure sensors 110, and speed sensors 112, and also to input device 102 and power source 4, for receiving commands and data, via conductive paths 108.

Power source 4 of hydro-mechanical transmission 10B selectively drives hydrostatic power unit 12 and planetary power unit 30, which in turn drives a plurality of range gear sets 58 which are coupled to a load L, which, again, will typically be the wheels or tracks of machine 1. Hydrostatic power unit 12 as shown in FIG. 3 is contained within the hydro-mechanical transmission housing 11 but it may also be external to the housing 11 and accessed with appropriate couplings. The hydrostatic power unit 12 includes a pump 16 coupled to a motor 18 with the hydrostatic power unit 12 coupled to a first input shaft 14 and a first output shaft 20. The power to the hydrostatic power unit 12 is provided by a driven gear 8 mounted on the first input shaft 14 and engaged with a hydrostatic power unit driving gear 7 mounted on the input shaft 6 of the power shaft 4. The pump 16 is in fluid communication with the motor 18 by appropriate conduits 17. The first output shaft 20 rotatably supports a gear for engaging a third input shaft of unit 30 as described below.

Figure 6:
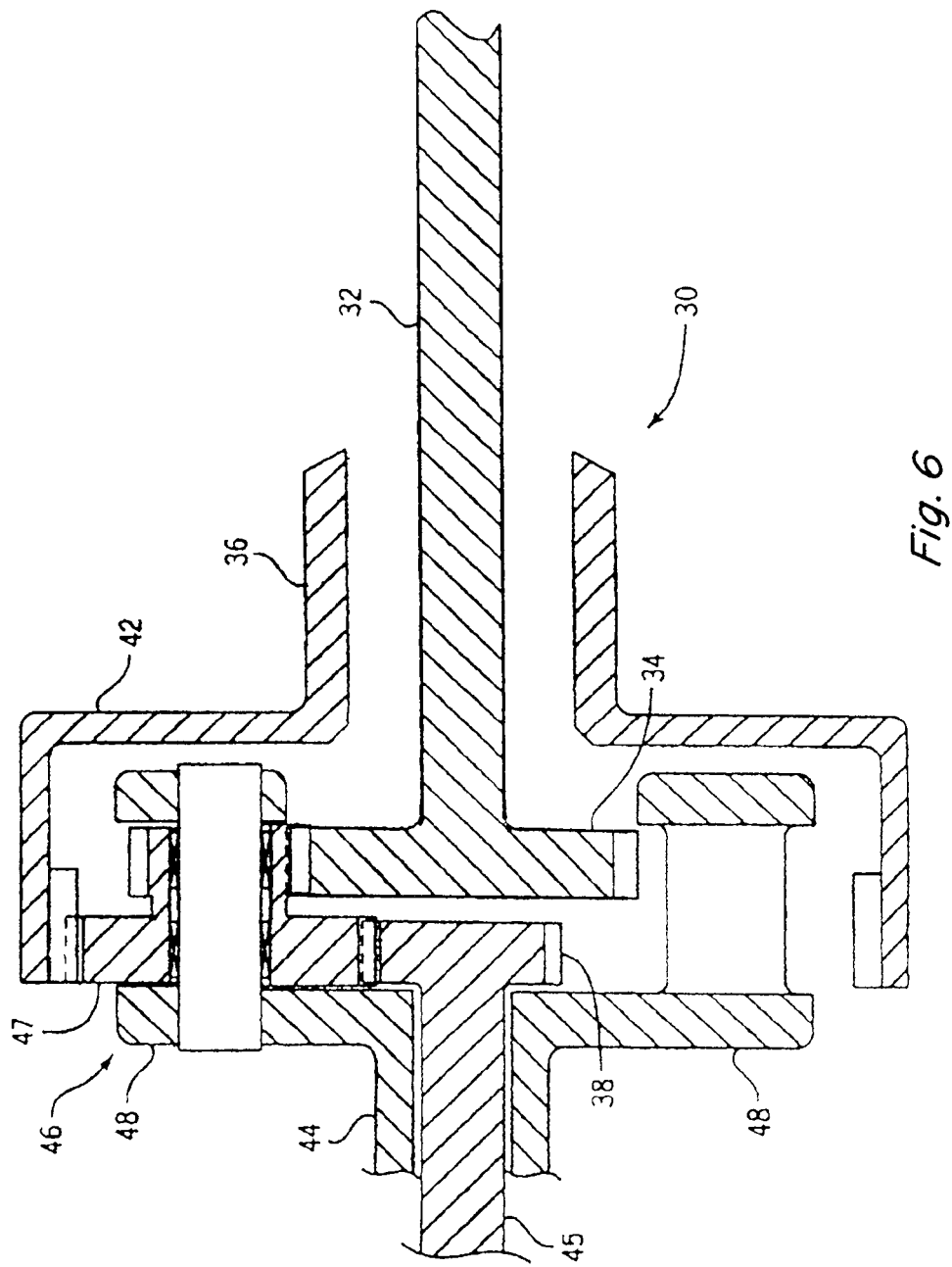
FIG. 6 is a partial view of an exemplary embodiment of a planetary power unit for the transmission of FIG. 3.

Planetary power unit 30 of transmission 10B includes a second input shaft 32, a third input shaft 36, a second output shaft 44 and a third output shaft 45 (see FIG. 6 also). Unit 30 is selectively coupled to the load L, coupled to the hydrostatic power unit 12 and selectively coupled to the power source 4. The unit 30 can be connected to a plurality of range gear sets 58 as will be described below. The second input shaft 32, the third input shaft 36, the second output shaft 44, and the third output shaft 45 are coaxial with the third input shaft being hollow and the second input shaft 32 being supported within the third input shaft 36. The second output shaft 44 is hollow and third output shaft 45 is supported within the hollow second output shaft 44. The hydro-mechanical transmission 10B also includes a load shaft 60 coupled to the load L and mounted for rotation in the housing. An intermediate shaft 56 supporting a plurality of range gear sets 58 is mounted for rotation in the housing and selectively coupled to unit 30 and the load shaft 60. A parking brake 114 is disposed in connection with load shaft 60 and is operable according to the invention as will be explained.

The planetary power unit 30 of the hydro-mechanical transmission 10B comprises a primary sun gear 34, which is coupled to the second input shaft 32. A ring gear 42 is coupled to the third input shaft 36 and coupled to the first output shaft 20 with the hydrostatic power unit with the gear 26 engaging the third input shaft 36. A compound planetary gear cluster 46 mounted on a compound planetary gear carrier 48 and engaged with the secondary sun gear 38 and the ring gear 42 is mounted within unit 30. A compound planetary gear carrier 48 is coupled to the second output shaft 44. The compound planetary gear cluster 46 includes three compound planetary gears 47.

In operation, the continuously variable hydro-mechanical transmission 10B can be operated to have a combined hydrostatic and mechanical power flow by engaging the reverse clutch 52 or forward clutch 54 which respectively drive a reverse drive gear 53 and a forward drive gear 55 which in turn drives the first input shaft 14 and the second input shaft 32. It is also possible to operate the hydrostatic mechanical transmission 10B for a pure hydrostatic power flow by disengaging both clutches 52 and 54 in which case the second input shaft 32 is not directly driven by the power source 4. In the pure hydrostatic mode, one range gear is coupled to carrier 48 and another range gear 58 is connected to the secondary sun gear 38 simultaneously.

The plurality of arranged gear sets 58 comprise an A-range output gear 80 coupled to the intermediate shaft 56 and engaged with an A-range input gear 82 mounted on the second output shaft 44. A B-range output gear 84 is coupled to the intermediate shaft 56 and engaged with a B-range input gear 86 mounted on the third output shaft 45. A C-range output gear 88 coupled to the intermediate shaft 56 and engaged with a C-range input gear 90 is mounted on the second output shaft 44. A D-range output gear 92 is coupled to the intermediate shaft 56 and engaged with D-range input gear 94 mounted on the third output shaft 45. A plurality of range selectors 74 are coupled to the intermediate shaft to provide the selection of range gear sets, under control of controller 100. A typical range selector 74 in this exemplary embodiment is a clutch 77 associated with the respective range gear sets. A main input drive gear 96 is coupled to the intermediate shaft 56 and engaged with a main output drive gear 98, which is mounted on the load shaft 60.

As stated above in this embodiment, there is no selection for a work range or road range per se. However, the four ranges (A-D) provide a seamless transition between ranges similar to the work/road configuration previously described. Speed change from zero to maximum speed is achieved in a smooth and continuous manner by changing the swash plate angle of the pump 16 under control of controller 100. For high efficiency, the first stall point of the motor 18 in the hydrostatic power unit 12 (i.e., ring gear 42 is a relative zero speed point) is selected in an optimum speed range, e.g., 7 to 9 km per hour, in order to transmit 100% of the power from the power source 4. A full shuttle reverse is also available through the clutches 52 and 54 since the directional change occurs on the input side (upstream side) of the planetary power unit 30. Since directional changes occur on the input side of unit 30, it may be necessary to adjust the position of the swash plate in motor 18 depending upon the desired forward to reverse speed change ratio, and this is done automatically by controller 100. Low speed pure hydrostatic power flow can be used during prolonged creep operation of the work machine 1 to prevent regenerative heat. Also, in the pure hydrostatic power flow mode, different ranges of creep speeds can be achieved by engaging different combinations of the range clutches. For example, range gear set A, 80, 82 and B range set 84, 86 can be simultaneously engaged through their respective range selectors 74. Similarly, range set 80 can be combined with D to obtain a different creep speed range as selected by the operator of the work machine 1. With this embodiment, it is also possible to shuttle between forward and reverse in either the combined hydro-mechanical mode or the pure hydrostatic mode. Further, in this embodiment, the machine speed can be controlled independent of engine speed enabling constant output speed from the PTO during implement operation.

Referring in particular to FIG. 4, the third embodiment of a hydro-mechanical transmission 10C, like embodiment 10B just discussed, eliminates the operator preselected work range or road range of speeds per se. Again, seamless speed changes from zero to a maximum speed, such as 50 km per hour can be obtained through four gear ranges defined as range "1", "2", "3", and "4" with synchronized shift points between each range to obtain the seamless speed changing. The synchronized ratio changing is automatically controlled by the controller and again takes place on the output side (downstream side) of the planetary power unit 30 which is constructed in the above described manner and has two outputs: a secondary sun gear NS2, and planetary gear carrier N13. As with transmissions 10A and 10B above, the controller is connected to the various actuators 106 of the clutches and pump 16, pressure sensors 110, and speed sensors 112, and also to an input device and power source 4 which is an engine, via conductive paths 108.

Power source 4 of hydro-mechanical transmission 10B selectively drives hydrostatic power unit 12 and planetary power unit 30, which in turn via secondary sun gear NS2 and planetary gear carrier N13, will drive selected ones of a plurality of range gear sets 58 which are coupled to a load L, which, again, will typically be the wheels or tracks of machine 1. Gear sets 58 are variously engageable by range selectors R1, R2, R3 and R4 under control of the controller. The hydrostatic power unit 12 includes a pump 16 in a fluid loop with a motor 18 with the hydrostatic power unit 12 coupled to power source 4 via an input gear N6 and having an output gear N10. The power to the hydrostatic power unit 12 is provided by a driven gear N4 mounted on the forward shaft and engaged with gear N6. Output gear N10 is connected to ring gear NR of planetary power unit 30 via gears N11 and N12.

Planetary power unit 30 is constructed essentially as shown in FIG. 6 but is numbered differently, including a primary sun gear NS1 on a planetary input shaft 32 connectable with power source 4 via a forward clutch 54 or a reverse clutch 52. Power unit 30 is selectively coupled to the load L, coupled to the hydrostatic power unit 12 and selectively coupled to the power source 4, under automatic control of the controller. For connection to the load L, the hydro-mechanical transmission 10C includes an output shaft 60 coupled to the load L which carries an input gear N18 engaged with an output gear N17 on a range 1/2 shaft of range gear set 58, and a gear N22 engaged with a gear N19 on a range 3/4 shaft. The range 1/2 shaft can be coupled to planetary power unit 30 via automatic operation of range selectors R1 and R2 for power flow through gears N13 and N14, or N15 and N16, respectively. The range 3/4 shaft can be coupled to unit 30 via range selectors R3 and R4 for power flow via gears N13 and N20, or N15 and N21. Range 1/2 shaft and range 3/4 shaft can also be simultaneously coupled to power unit 30, to provide dual power flow.

In operation, the continuously variable hydro-mechanical transmission 10C can be operated to have a combined hydrostatic and mechanical power flow by engaging the reverse clutch 52 to power planetary power unit 30 via gears N1, N3, N5 and N7, or engaging forward clutch 54 to power it via gears N1, N8, and N2. It is also possible to operate the hydrostatic mechanical transmission 10C for a pure hydrostatic power flow by disengaging both clutches 52 and 54.

As stated above, in this embodiment, there is no selection for a work range or road range per se. However, the ranges provide a seamless transition between ranges similar to the work/road configuration previously described. Speed change from zero to maximum speed is achieved in a smooth and continuous manner by changing the swash plate angle of the pump 16 under control of controller 100. For each speed range, substantially the full range of travel of the swash plate is used. That is, the swash plate will be at one end of the range its travel for minimum speed within the range, it will be at the other end for maximum speed in that range, and the zero tilt or neutral position of the swash plate will be an intermediate position for the speed range, not the zero speed position as it is for some other transmissions. This presents a challenge for execution of some transmission commands that require a change of state wherein the swash plate will have to be tilted to a position significantly different from the present position, as some time for the transition or movement to the new position will be required. For some commands, such as initiating movement from a stationary position, shuttle shifts, and other commands wherein the direction of travel is reversed, and/or a speed range is changed, the swash plate may have to be moved through a substantial portion or all of its range of travel.

Figure 7:
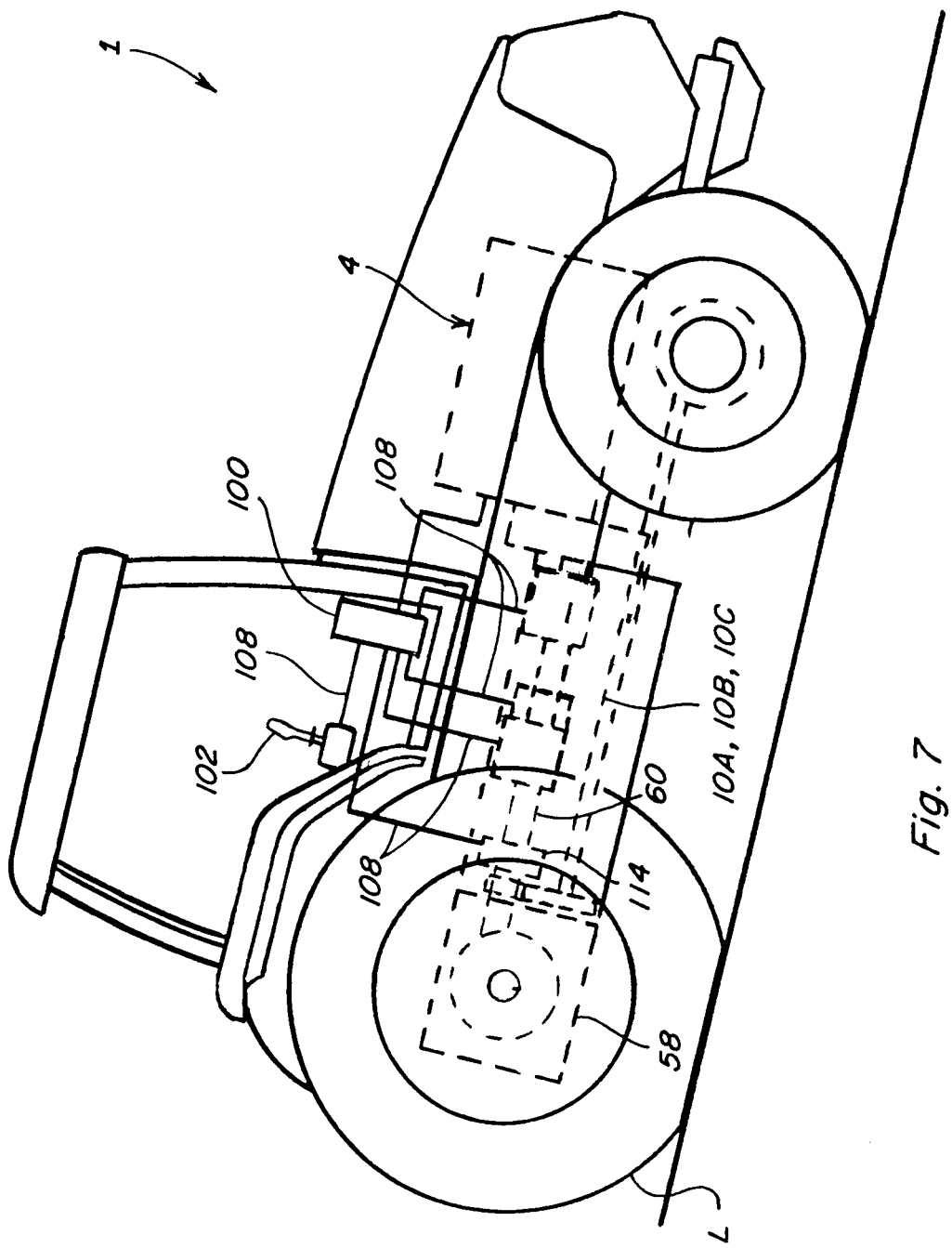
FIG. 7 is a side view of the work machine of FIG. 1, illustrated on an incline and including a proportionally controlled parking brake automatically operable according to the invention.

Additionally, in transmissions such as 10B and 10C wherein the directional clutches are upstream of the power units, the transmission will be disengaged from the load as the shift is made when shuttle shifting. As a result, unless held in place, the machine may have a tendency to unintentionally move, as noted above, particularly, if on a slope, as illustrated in FIG. 7, and/or momentum is present.

As noted above, work machine 1 includes a parking brake 114 (see FIG. 7) in connection with load shaft 60, which, according to a method of the invention, is automatically engaged to hold or prevent movement of machine 1, and automatically released in a predetermined manner under certain conditions for allowing movement of the machine in a commanded manner. Parking brake 114 is connected to controller 100 via a suitable conductive path 108 for automatic operative control thereby, including to proportionally or gradually engage, and proportionally or gradually release or disengage, under certain conditions. To achieve these capabilities, as a non-limiting example, parking brake 114 can be controlled using a proportional pressure reducing valve operated by an electrical signal from controller 100. For operation when machine 1 is not operating, parking brake 114 can be engaged by a spring or other biasing element or elements, or by mechanical means.

Conditions wherein parking brake 114 will be automatically controlled by controller 100 to engage, or remain engaged if already engaged, can include, but are not limited to, when power source 4 of machine 1 is turned off, and the transmission is disengaged.

Controller 100 will also control the parking brake to remain engaged when a command is received to disengage the parking brake, until certain conditions are met, as will be explained. Other conditions include when a command is received via an input device 102, e.g., FNR lever or the like, to change the operating state of the transmission. Such commands can include a change to, or in close proximity to, a neutral or zero movement state, or a clutch command.

Figure 8:
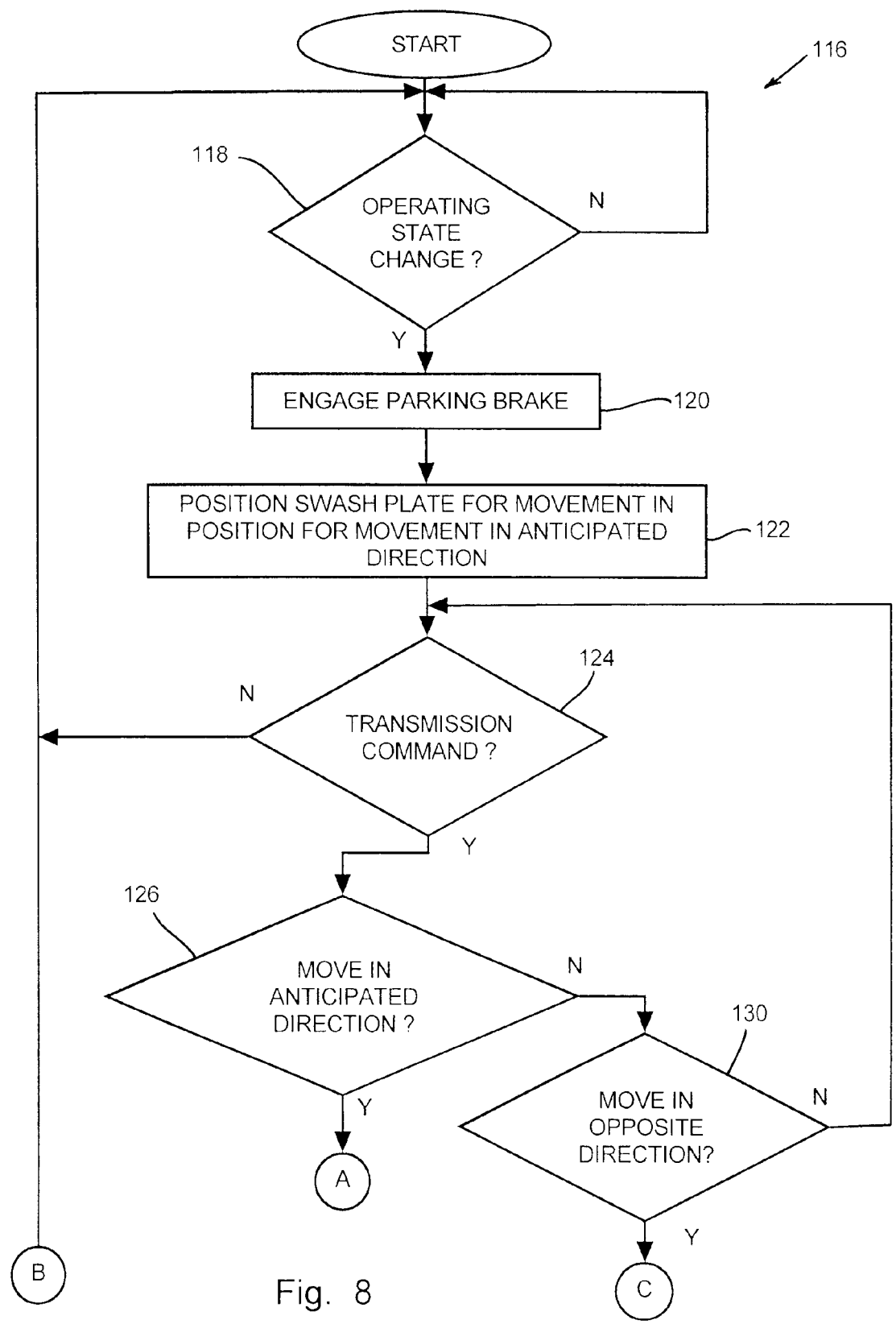
FIG. 8 is a high level flow diagram showing steps of a method of the invention.
Figure 8A:
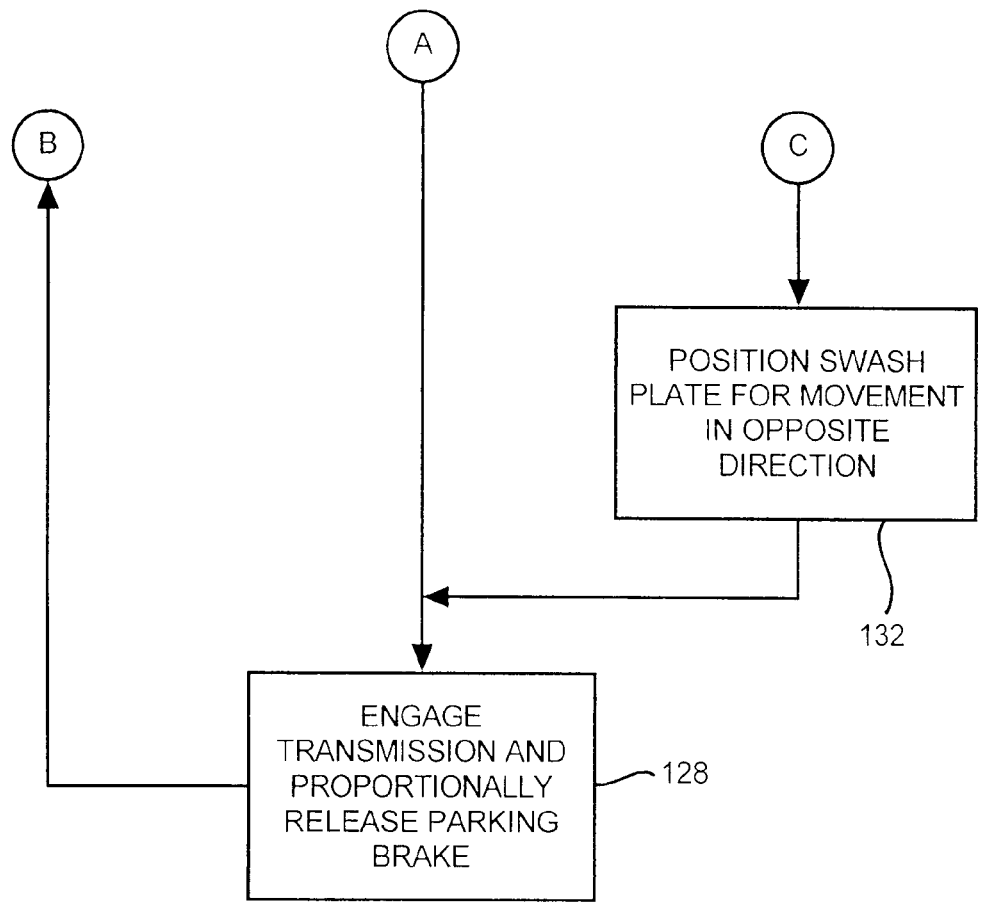
FIG. 8A is a continuation of the diagram of FIG. 8.

Referring to FIGS. 8 and 8A, a high level flow diagram 116 is shown, illustrating steps of a preferred method of operation of parking brake 114 in cooperation with operation of transmission 10A according to the invention for holding machine 1 in position and facilitating the commanded change of state. The method of the invention is likewise applicable to transmissions 10A and 10B, as well as other transmission architectures utilizing a hydrostatic power unit for controlling speed.

As an initial step, at decision block 118, controller 100 monitors commands for the operating state changes in which parking brake 114 will be automatically operated under command of controller 100. As just noted, this can include, but is not limited to, an operator inputted command, e.g., via the FNR lever to move to, or in close proximity to, a neutral or zero movement state, a clutch command such as to disengage the transmission, start up of power source 4, or a command to disengage one or more clutches of the transmission. This can also include an automatic routine wherein a timer counts the time since the operator last commanded motion, wherein the parking brake is automatically applied to limit the time that the vehicle is in a powered zero state wherein the hydrostatic power unit is operating at a high speed and consumes more power than when at a zero speed. The controller can also be programmed to turn on the parking brake when the operator leaves the operator seat.

When one or more of the commands is/are received, parking brake 114 will be engaged, or maintained in engagement, as denoted in block 120. This will hold machine 1 in its present position, which is advantageous on hills as it eliminates the possibility of movement down hill (see FIG. 7). It is also advantageous for example when shuttle shifting, as it dissipates momentum. In this regard, it should be mentioned that an additional benefit of a proportionally controllable parking brake is that it can be applied in a gradual manner, for instance, to help decelerate the vehicle in a desired manner, e.g., at a desired rate, or according to a desired deceleration profile, which can be determined from output speed information in a closed loop, or open loop manner, e.g., by having different time based profiles for increasing the applied brake pressure (this will be effected by a reduction in fluid pressure to the brake if applied by spring pressure). With machine 1 held in position, or being decelerated at a slow speed by gradual application of the parking brake, if the transmission is engaged, it can be safely disengaged. At or about this time, controller 100 will also automatically move the swash plate of pump 16 via operation of actuator 106 to a position for movement in an anticipated or predicted direction, as denoted at block 122, or hold the swash plate in that position if already there. This can be, but is not limited to, a position for zero movement in the anticipated direction, which, for the transmission 10C, will be at or near one end of the range of travel of the swash plate of pump 16. Thus, even for a command to only start power source 4, or to release parking brake 114, a swash plate movement to the required position for the anticipated movement direction will be made, or, if the swash plate is already in the position, it will be held there. The anticipated direction of movement can be predetermined, or determined based on one or more factors, such as the previous direction of movement, or a history or pattern of movement. As a non-limiting simple example, the direction of movement can be the forward direction. As an optional step at this time, controller 100 can also engage the directional clutch for the anticipated of predicted direction of movement.

As a next step, controller 100 awaits the next transmission command, as denoted at decision block 124, and will loop through the sequence of steps of blocks 118, 120, 122 and 124 awaiting a command. When a transmission command is received, it will be next determined whether it is a command to move in the anticipated or predicted direction, as denoted at decision block 126. If yes, following balloon A to block 128 in FIG. 8A, controller 100 will proceed to engage the transmission, and execute the commanded movement, release the parking brake, and following balloon B loop back to decision block 118 to await the next change of state command.

With regard to the release of the brake, it is preferred to be performed gradually as controlled by the controller signal, which will preferably be proportionally to the engagement of the transmission, which can occur, for example, as the selected range is engaged, and/or the swash plate is moved to achieve the commanded movement of machine 1. As a non-limiting example, automatically gradually or proportionally releasing of the parking brake can be done as a function of time. For instance, via a pressure profile based on time, e.g., using a lookup table. Another possibility is to vary this profile as a function of vehicle load and/or the incline of the vehicle. Also in this regard, as torque and pressure build in the hydrostatic power unit due to the oncoming load, controller 100 will vary the swash plate position to settle it as required to achieve the commanded machine speed. This is advantageous as it avoids lurching and undesired movements that can result from improper swash plate positioning, and the disengagement of the parking brake proportionally will facilitate smooth engagement.

Returning to block 126 in FIG. 8, if the received transmission command is not for movement in the anticipated or predicted direction, it is determined whether movement in the direction opposite the anticipated direction is commanded, as denoted by decision block 130. If not, controller 100 will loop back to decision block 124 to await the next command, and the parking brake remains engaged. If movement in the direction opposite the anticipated direction is commanded, the swash plate will have to be repositioned, as indicated following balloon C to block 132 in FIG. 8A, which will require time which can be substantial if the swash plate must be repositioned to the opposite end of its range of travel or near that end. During this period, the parking brake will remain engaged. Then, once the swash plate is positioned, the transmission will be engaged and the parking brake released gradually in the above explained manner in concert with any required movement and settling of the swash plate to achieve the commanded speed, and the controller will loop back via balloon B to block 118 to await the next command.

Here it should be noted that commands other than those to change the operating state of the transmission, e.g., speed change commands within a selected range, will be handled in the routine manner, without associated actuation of the parking brake. With the present invention, change of state commands such as shuttle shifts wherein the FNR lever is moved to slow in a first direction of movement, through zero speed, and then to increase speed in an opposite or second direction, are handled without unintended machine movements that can result from momentum in the original direction of movement, and/or location on a slope or hill. Also, for other commands such as initial movement after powering up the power source, and operator release of the parking brake, the brake is not released until the transmission is ready and being engaged. Still further, as noted above, with the proportional release or disengagement of the parking brake, undesired conditions such as lurching are avoided.

It will be understood that the foregoing descriptions are for preferred embodiments of this invention and that the invention is not limited to the specific forms shown. Other modifications may be made in the design and arrangement of other elements without departing from the scope of the invention as expressed in the appended claims.

What is claimed is:

1. A method of operating a continuously variable hydromechanical transmission of a vehicle, comprising steps of:
    responsive to an inputted predetermined command to change an operating state or condition of the transmission or starting an engine of the vehicle:
    automatically engaging or maintaining engagement of a parking brake of the vehicle to hold the vehicle at an existing position; and
    automatically moving a swash plate of a hydrostatic power unit of the transmission to a predetermined position for movement of the vehicle in an anticipated direction; then,
    if a command is received to operate the transmission to move the vehicle in the anticipated direction, then automatically engaging the transmission for moving the vehicle, and gradually releasing the parking brake to allow the vehicle to move; or
    if a command is received to operate the transmission to move the vehicle in a direction opposite the anticipated direction, then automatically moving the swash plate to a predetermined position for movement of the vehicle in the direction opposite the anticipated direction, then automatically engaging the transmission to move the vehicle while gradually releasing the parking brake to allow the vehicle to move.

2. The method of claim 1, wherein the predetermined command comprises a command to move the vehicle.

3. The method of claim 2, wherein the predetermined command comprises a command to move in a forward direction.

4. The method of claim 1, wherein the predetermined command comprises a speed range command.

5. The method of claim 1, wherein the predetermined command comprises a command to release the parking brake.

6. The method of claim 1, wherein the step of automatically moving the swash plate of the hydrostatic power unit of the transmission to the predetermined position for movement of the vehicle in the anticipated direction comprises an additional step of automatically engaging a directional clutch for the anticipated direction.

7. The method of claim 6, wherein the step of automatically moving the swash plate to the predetermined position for movement of the vehicle in the direction opposite the anticipated direction comprises disengaging the directional clutch for the anticipated direction and engaging a directional clutch for the direction opposite the anticipated direction.

8. The method of claim 1, wherein the step of automatically moving the swash plate of the hydrostatic power unit of the transmission to the predetermined position for movement of the vehicle in the anticipated direction comprises moving the swash plate to a maximum or near maximum tilted position in one direction.

9. The method of claim 1, wherein the step of automatically moving the swash plate of the hydrostatic power unit of the transmission to the predetermined position for movement of the vehicle in the direction opposite the anticipated direction comprises moving the swash plate to a maximum or near maximum tilted position in a second direction opposite the one direction.

10. The method of claim 1, wherein the step of gradually releasing the parking brake comprises releasing the parking brake proportionally relative to a controller signal.

11. A method of operating a continuously variable hydromechanical transmission of a vehicle, comprising steps of:
    while the vehicle is moving, responsive to an inputted command to operate the transmission to reduce ground speed to zero, automatically engaging a parking brake of the vehicle to hold the vehicle at an existing position, disengaging the transmission from driveline elements, and moving a swash plate of a hydrostatic power unit of the transmission to a predetermined position for movement of the vehicle in a predicted direction; and then,
    if a command is received to operate the transmission to move the vehicle in the predicted direction, automatically engaging the transmission with the driveline elements for moving the vehicle and gradually releasing the parking brake to allow the vehicle to move; and
    if a command is received to operate the transmission to move the vehicle in a direction opposite the predicted direction, then automatically moving the swash plate to a predetermined position for movement of the vehicle in the direction opposite the predicted direction, then automatically engaging the transmission with the driveline elements, and gradually releasing the parking brake to allow the vehicle to move.

12. The method of claim 11, wherein the step of automatically moving the swash plate of the hydrostatic power unit of the transmission to the predetermined position for movement of the vehicle in the predicted direction comprises an additional step of automatically engaging a directional clutch for the predicted direction.

13. The method of claim 12, wherein the step of automatically moving the swash plate to the predetermined position for movement of the vehicle in the direction opposite the predicted direction also comprises disengaging the directional clutch for the predicted direction and engaging a directional clutch for the direction opposite the predicted direction.

14. The method of claim 11, wherein the step of gradually releasing the parking brake comprises releasing the parking brake proportionally relative to a controller signal.

15. A method of operating a continuously variable hydromechanical transmission of a vehicle, comprising steps of:
    responsive to a command to operate the transmission to reduce a speed of movement of the vehicle in a first direction to zero, automatically gradually engaging a parking brake of the vehicle to reduce the speed of movement, and if not moving, automatically engaging the parking brake to hold the vehicle at an existing position, and disengaging the transmission from driveline elements of the vehicle; and,
    responsive to a command to operate the transmission to move the vehicle in a selected direction, while the transmission is disengaged, automatically moving the swash plate to a predetermined position for moving the vehicle in the selected direction, then automatically engaging the transmission with the driveline elements, and gradually releasing the parking brake to allow the vehicle to move.

16. The method of claim 15, wherein the step of automatically moving the swash plate to the predetermined position for moving the vehicle in the selected direction comprises engaging a directional clutch for the selected direction.

17. The method of claim 15, comprising a step after the step of automatically engaging the parking brake and disengaging the transmission responsive to an inputted command to operate the transmission to reduce ground speed to zero, of automatically moving the swash plate to a position for zero movement of the vehicle in a predicted direction.

18. The method of claim 17, wherein the step of automatically moving the swash plate to a position for zero movement of the vehicle in the predicted direction comprises automatically engaging a directional clutch for moving the vehicle in the predicted direction.

19. The method of claim 15, wherein the step of gradually releasing the parking brake comprises releasing the parking brake proportionally relative to a controller signal.

* * * * *